United States Patent
Jiang

(10) Patent No.: US 11,324,095 B2
(45) Date of Patent: May 3, 2022

(54) AUTOMATIC STAGE LIGHTING TRACKING SYSTEM AND A CONTROL METHOD THEREFOR

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

(*) Notice: Subject to any disclaimer, the term of this patent is extended or adjusted under 35 U.S.C. 154(b) by 113 days.

(21) Appl. No.: 16/831,173

(22) Filed: Mar. 26, 2020

(65) Prior Publication Data

US 2020/0229287 A1  Jul. 16, 2020

Related U.S. Application Data

(63) Continuation of application No. PCT/CN2018/102573, filed on Aug. 27, 2018.

(30) Foreign Application Priority Data

Sep. 30, 2017  (CN) .......................... 201710922477.9

(51) Int. Cl.
  *H05B 47/125* (2020.01)
  *H05B 47/155* (2020.01)
  (Continued)

(52) U.S. Cl.
  CPC ......... *H05B 47/125* (2020.01); *F21V 23/003* (2013.01); *H05B 47/10* (2020.01);
  (Continued)

(58) Field of Classification Search
  CPC ....................... F21W 2131/406; H05B 47/125
  See application file for complete search history.

(56) References Cited

U.S. PATENT DOCUMENTS

| | | | | |
|---|---|---|---|---|
| 6,079,862 A | * | 6/2000 | Kawashima | ......... H05B 47/125 382/103 |
| 2002/0093296 A1 | * | 7/2002 | Belliveau | ............... H05B 47/18 315/294 |

(Continued)

FOREIGN PATENT DOCUMENTS

| CN | 101014097 A | 8/2007 |
|---|---|---|
| CN | 201689343 U | 12/2010 |

(Continued)

OTHER PUBLICATIONS

International Search Report for CN Application No. PCT/CN2018/102573 dated Nov. 29, 2018, 4 pages.

(Continued)

*Primary Examiner* — Sean P Gramling
(74) *Attorney, Agent, or Firm* — Lerner, David, Littenberg, Krumholz & Mentlik, LLP

(57) ABSTRACT

An automatic stage lighting tracking system comprises an emitting element detachably mounted on a target to be tracked, a stage light source element for illuminating the tracked target, an upper computer software having an OpenCV computer vision library and a DMX512 console, and a photographing element for detecting a position of the emitting element and photographing an image of the target, and transmitting the image and position signal to the upper computer software.

9 Claims, 2 Drawing Sheets

(51) Int. Cl.
  *H05B 47/13* (2020.01)
  *F21V 23/00* (2015.01)
  *H05B 47/10* (2020.01)
  *H05B 47/18* (2020.01)
  *F21Y 115/10* (2016.01)
  *F21W 131/406* (2006.01)

(52) U.S. Cl.
  CPC .......... *H05B 47/13* (2020.01); *H05B 47/155* (2020.01); *H05B 47/18* (2020.01); *F21W 2131/406* (2013.01); *F21Y 2115/10* (2016.08)

(56) References Cited

U.S. PATENT DOCUMENTS

| | | |
|---|---|---|
| 2011/0149575 A1 | 6/2011 | Quadri |
| 2011/0211110 A1* | 9/2011 | Doublet ............... H05B 47/125 348/370 |
| 2015/0110355 A1 | 4/2015 | Dill |
| 2016/0195856 A1 | 7/2016 | Spero |

FOREIGN PATENT DOCUMENTS

| | | |
|---|---|---|
| CN | 103838061 A | 6/2014 |
| CN | 205320339 U | 6/2016 |
| CN | 106954325 A | 7/2017 |
| CN | 107567169 A | 1/2018 |
| CN | 207603961 U | 7/2018 |
| EP | 0814344 A2 | 12/1997 |

OTHER PUBLICATIONS

Extended European Search Report including Written Opinion for Application No. EP18861335.0, dated Nov. 11, 2020, pp. 1-10.

* cited by examiner

AUTOMATIC STAGE LIGHTING TRACKING SYSTEM AND A CONTROL METHOD THEREFOR

CROSS REFERENCE TO RELATED APPLICATIONS

The present application is a continuation of International Application No. PCT/CN2018/102573, filed on Aug. 27, 2018, which claims priority from Chinese Patent Application No. 201710922477.9 filed on Sep. 30, 2017, all of which are hereby incorporated herein by reference.

TECHNICAL FIELD

The present invention relates to a stage lighting control system, particularly to an automatic stage lighting tracking system and a control method therefor.

BACKGROUND

There are roughly several types of existing stage lighting illuminating devices as follows.

Ordinary lighting device group which manually controls the direction: when operating this type of device, personnel is required to manually adjust the illumination direction and brightness of the lighting, and different lighting groups require different personnel to control; and due to factors such as personnel fatigue or delay in response, the accuracy is poor in use and a lot of manpower is required.

Automatic stage lighting tracking system with multiple pressure sensors detecting target position: this type of system is operated mainly by arranging multiple detection elements (pressure sensors) on a stage, detecting the position of a target in real time, and controlling the illumination direction of lighting, such that stage lighting automatically follows the movement of the target, thereby achieving the purpose of automatic unmanned operation. For example, the utility model with the patent number of CN201689343U (An automatic stage lighting tracking system) can implement the function of automatically tracking a target. The disadvantages of this type of system lie in that, a pressure sensor array needs to be arranged on the stage, and it is unable to track when the feet of the tracked performer leave from the stage, and may also be interfered by other objects with weight on the stage.

Automatic stage lighting tracking system with multiple locating base stations detecting target position: this type of system is operated mainly by arranging multiple locating base stations on a stage, detecting the distance from a tracked target (a locating unit) in real time, calculating the position of the tracked target by means of a locating algorithm, and calculating the illumination direction of the control lighting according to the placement position of the base stations, such that stage lighting automatically follows the movement of the target, thereby achieving the purpose of automatic unmanned operation. For example, in the patent number CN205320339U (An intelligent stage spotlight control element), a locating element built in a microphone is used to communicate, in real time, with a locating base station arranged on a stage, so as to dynamically locate a target person, thereby achieving the function of automatically tracking a target. The disadvantages of this type of system lie in that, multiple locating base stations need to be arranged on the stage, and also the distance between the locating base stations has to be accurately measured, and when the locating base station or microphone (locating element) encounters an obstacle, the position of the locating target may be interfered, with an inherent error in the measurement distance of the wireless communication locating modules, thereby leading to inaccurate locating and thus affecting the accuracy of the lighting following the movement of the target.

There is some automatic tracking configuration in the above-mentioned existing stage lighting control systems, except manual monitoring and manual operation. However, such configuration exists application limitations and is susceptible to external interferences.

SUMMARY

In order to overcome existing technical defects, the present invention provides an automatic stage lighting tracking system capable of fully automatically tracking the real-time position of a stage actor and automatically gathering the lighting spot on the actor with simple operations, strong practicability and a good anti-interference performance.

According to the present invention, the automatic stage lighting tracking system comprises an emitting element, a stage light source element, upper computer software and a photographing element, wherein the emitting element is detachably mounted on a target to be tracked; the stage light source element is used for illuminating the tracked target; and the photographing element is used for detecting the position of the emitting element and photographing an image of the target, and transmitting the image and position signal to the upper computer software, wherein the upper computer software is provided with an OpenCV computer vision library and a DMX512 console, the OpenCV computer vision library is used for processing the image transmitted by the photographing element, extracting, identifying and tracking the target according to a color in the image, then calculating a deviated position of the target relative to an illumination direction of a stage light source, and sending the deviated position to the stage light source element by means of the DMX512 console, and the stage light source element controls the illumination direction to go toward the target, such that the stage lighting automatically tracks the movement of the target.

After the target or a stage performer carries the emitting element, the photographing element can detect the position of the target according to the emitting element and then transmit position information of the target to the upper computer software; the OpenCV computer vision library in the upper computer software performs target identification in advance according to the image transmitted from the photographing element and determines the coordinates of the target; after the photographing element transmits the position information of the target, the OpenCV computer vision library may determine the coordinates of the target according to the current real-time position of the target, then compare current real-time coordinates of the target with previous coordinates to determine displacement information of the target, and finally, transmit the displacement information to the stage light source element by means of the DMX512 console; and then the illumination direction of the stage light source element is controlled to go toward the target, such that the stage lighting automatically tracks the movement of the target.

Further, the emitting element is an infrared emitting element for emitting infrared invisible light.

The infrared emitting element is used to emit infrared invisible light which can be detected by the photographing element. After the target or a stage performer carries the infrared emitting element, the photographing element can detect the position of the target according to the infrared invisible light emitted by the infrared emitting element, and then transmit information of the position of the target to the upper computer software.

the OpenCV computer vision library is provided with a camshift tracking algorithm, the OpenCV computer vision library sends the identified color of the target to the camshift tracking algorithm, and the camshift tracking algorithm tracks the movement of the target, obtains coordinate information of the target, and sends the coordinate information to the upper machine software.

The camshift tracking algorithm is a color-based tracking algorithm in OpenCV, with a basic idea of performing a MeanShift operation on all frames of a video image, and using a result of the previous frame (i.e., the center and size of a search window) as an initial value of the search window of the MeanShift algorithm of the next frame, and so forth.

Further, the photographing element is mounted on the stage light source element. The photographing element is parallel to a light-emitting optical axis of the stage light source element and rotates together with the stage light source element, and will change a tracked photographing angle as the illumination direction of the stage light source element changes.

By mounting the photographing element on the stage light source element, the detection range of the photographing element can be effectively reduced, and it is easier and faster to find the emitting element to be detected. On the other hand, because the stage light source element is rotated at any time, the photographing range of the photographing element is also enlarged.

Further, the stage light source element comprises a stage light and implements signal transmission with the DMX512 console by means of a DMX512 converter, the photographing element is mounted on the stage light, and the upper computer software of the control element transmits a control signal to the DMX512 console, and then the DMX512 console executes, by means of the DMX512 converter, a control command to control the illumination direction of the stage light, such that the stage lighting automatically tracks the movement of the target.

The DMX512 console is used for executing the control signal transmitted from the upper computer software, and then transmitting, by means of the DMX512 converter, the control signal to the stage light source element, which controls the illumination direction of the stage light to go toward the target, such that the stage lighting automatically tracks the movement of the target.

Further, the photographing element comprises a camera and a filter mounted in the camera for cutting off the transmission of visible light.

The filter can effectively remove the interference of visible light on the tracking of a target infrared emitting element.

Further, the infrared emitting element comprises a light-emitting driving circuit and several infrared LEDs with a wavelength of 940 nm, and the infrared LEDs are respectively in communication with the light-emitting driving circuit.

Infrared invisible light generally has two wavelengths of 850 nm and 940 nm, and the infrared invisible light with a wavelength of 940 nm has a longer life, is less visible to the naked eyes and has a better stage effect. Further, the number of several infrared LEDs with a wavelength of 940 nm is preferably multiple, and mounting multiple infrared LEDs can further enlarge the light-emitting range of the infrared emitting element, improve the brightness of infrared invisible light, and enable the photographing element to more quickly find a light emitting source of the infrared invisible light; on the other hand, as multiple infrared LEDs are provided, when one of the infrared LEDs fails, other infrared LEDs can continue to work, thereby avoiding the situation of the photographing element being unable to detect the infrared invisible light due to the failure of the infrared LED, and thus improving the service life and practicability of the automatic stage lighting tracking system.

The present invention also provides a control method using the above-mentioned automatic stage lighting tracking system, comprising S1: an emitting element being detachably mounted on a target to be tracked;

S2: a photographing element detecting the position of the emitting element and photographing an image of the target, and transmitting the image and position signal to upper computer software; and S3: the upper computer software identifying the emitting element from the image, and then controlling, according to the position signal, the illumination direction of the stage light source element to go toward the target, such that the stage lighting automatically tracks the movement of the target.

Further, the implementation method for step S2 is: first, presetting the illumination direction of the stage lighting to point to the target, adjusting the lighting effect of the stage lighting, and then the photographing element photographing the image of the target and monitoring the position of the target in real time, and transmitting the image and position information to the OpenCV computer vision library in the upper computer software of the control element.

Further, the implementation method for step S3 is: the OpenCV computer vision library receiving the image and position signal transmitted from the photographing element, first extracting and identifying the target from the image, determining the coordinates of the target in the image according to the position information of the target, then tracking the movement of the target in real time, calculating, according to a movement position of the target, information of position of the target deviated from the original coordinates in the image in real time, and transmitting the information of deviated position to the stage light source element by means of the DMX512 console; and finally, the stage light source element controlling the illumination direction of the stage lighting to go toward the target, such that the stage lighting automatically tracks the movement of the target.

In the above-mentioned automatic stage lighting tracking control method, the photographing element needs to collect the image from the emitting element, so the target to be tracked on the stage needs to carry the emitting element, the illumination direction of the stage lighting is preset to point to the target, and the lighting effect of the stage lighting is adjusted. The photographing element is fixed on the stage light, such that an angle photographing direction of the photographing element is consistent with the illumination direction of the stage light. The upper computer software calculates the position of the target person's position in the image in real time by means of the OpenCV computer vision library and camshift tracking algorithm; the photographing element obtains the central coordinates of the target by detecting the emitting element in real time; if it is not in the central position of the image (including X-axis and Y-axis), the values of scanning channels of the stage light in horizontal and vertical directions are controlled to change, such that the lighting moves toward the direction of the target position until the target is located near the central position of the collected picture. Since the photographing element and the stage light source element are mounted together with the same direction, the photographing element may change the photographing angle as the illumination direction of the stage light changes. Since the photographing element can be rotated, the detectable target movement range may be outside the stage with very strong flexibility.

As for such type of tracking device as the automatic tracking illuminating device, illuminating controller and tracking device with patent number CN97117445.8, an image photographing element is used to photograph an image within an illumination space of an illuminating element, an image discrimination element is used to discriminate an illuminated target and determines the coordinates of the target, then a computing element is used to calculate a relationship between the coordinates of the illuminated target and the position of the illuminating element to calculate the amount of movement in an illumination direction, and finally, a control element is used to control the driving of a driving element, so as to control the illumination direction of the illuminating element. This type of equipment is relatively cumbersome and complex and is inconvenient to mount and implement. However, we are using the high-speed computing power of current computers and the OpenCV computer vision library, which is widely applied in the field of image processing, in which case, with the need of only transmitting the image photographed by the photographing element to the computer, the upper computer software of the computer may identify the target object, track the movement of same, determine the coordinates of the target and calculate a deviated position of the target relative to the illumination direction of the stage light source; moreover, the DMX512 console is integrated on the upper computer software of the computer, and the computer outputs the values of scanning channels of the stage light source device in the horizontal direction or the vertical direction directly by means of the DMX512 converter, and controls the illumination direction of the stage light source device to track the moving target. The operation is simple and has strong practicality. An operator only needs to operate the upper computer software on the computer, and the control method is suitable for all stage lights that can be controlled by the DMX512 console, and has strong flexibility.

Compared with the prior art, the automatic stage lighting tracking system and the control method therefor provided in the present invention is simple in operation, with strong practicability wide application range and good anti-interference performance.

DETAILED DESCRIPTION OF EMBODIMENTS

In order to make the object, technical solutions and advantages of the present invention clearer, the embodiments of the present invention are described in further detail below with reference to the accompanying drawings.

Figure 1:
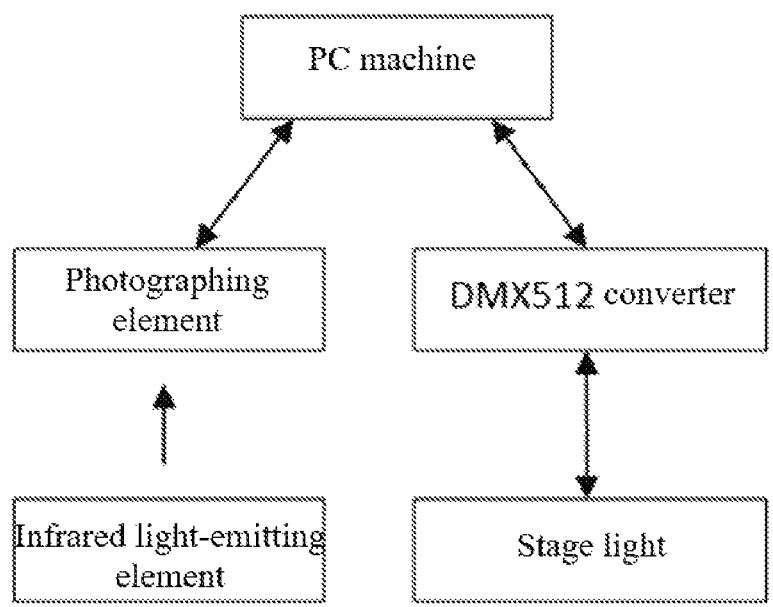
FIG. 1 is a schematic diagram of the composition of an automatic stage lighting tracking system according to an embodiment.
Figure 2:
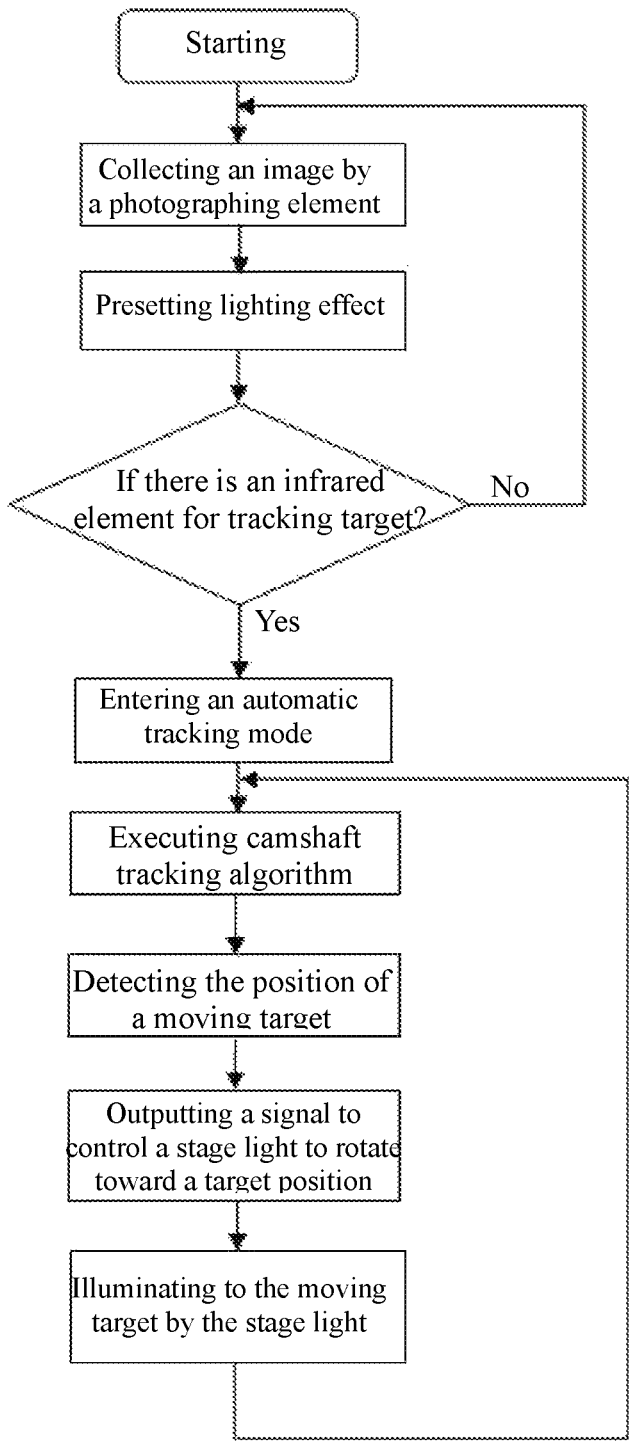
FIG. 2 is a working flow chart of an automatic stage lighting tracking system according to the embodiment.

According to an embodiment, as shown in FIGS. 1 and 2, an automatic stage lighting tracking system comprises an emitting element, a photographing element, an upper computer software, and a stage light source element. In the present embodiment, the upper computer software is a PC machine. The PC machine is provided with an OpenCV computer vision library having a camshift tracking algorithm. The stage light source element comprises a DMX512 converter and a stage light. The photographing element comprises a camera and a filter that is mounted on the camera and capable of cutting off all visible light. The emitting element is an infrared emitting element for emitting infrared invisible light, and the infrared emitting element is provided with a light-emitting driving circuit and multiple infrared LEDs with a wavelength of 940 nm.

Specifically, the infrared emitting element is detachably mounted on a target to be tracked on a stage. The photographing element can collect an image from the infrared emitting apparatus and send such image to the PC machine, the PC machine then can extract the identified target therefrom, monitor the infrared light-emitting target in real time by means of the camshift tracking algorithm, and obtain central coordinates of the target. When the target deviates from the central position of the collected image in the X-axis direction, the PC machine will connect with the DMX512 converter to adjust and output the values of scanning channels in the horizontal direction. Then the electric motor of the stage lights driven to rotate so as to move the lighting horizontally to the target position. When the target deviates from the central position of the collected image in the Y-axis direction, the values of scanning channels in the vertical direction are adjusted and output so as to move the lighting vertically to the target position until the target is located near the central position of the collected image, thereby implementing the function of the stage lighting automatically tracking the moving target.

As shown in FIG. 2, according to the present embodiment, the control flow of the automatic stage lighting tracking system comprises: firstly, starting the upper computer software of the PC machine, presetting the illumination direction of the stage lighting to point to the target by means of the DMX512 console, adjusting the lighting effect of the stage lighting, and enabling the photographing element to find the infrared light-emitting element to be tracked to photograph a picture, and saving a photographing color of the infrared light-emitting element as a picture; then, starting an automatic tracking mode, the upper computer first loading the picture of the target color, comparing same with the image collected by the photographing element, extracting the identified target therefrom, tracking the infrared light-emitting target in real time by means of the camshift tracking algorithm and determining the coordinates of the target. When the target deviates from the central position of the collected image in the X-axis direction, the PC machine will connect with the DMX512 converter to adjust and output the values of scanning channels in the horizontal direction, and control the illumination direction of the stage light to move horizontally to the target position; and when the target deviates from the central position of the collected image in the Y-axis direction, the values of scanning channels in the vertical direction will be adjusted and output by the DMX512 converter, and the illumination direction of the stage light will be controlled to move vertically to the target position until the target is located near the central position of the collected image, thereby implementing the function of the stage lighting automatically tracking the moving target.

The present embodiment also provides a control method using the above-mentioned automatic stage lighting tracking system, comprising:

S1: an infrared emitting element being detachably mounted on a target to be tracked, and emitting infrared invisible light;

S2: a photographing element detecting the position of the infrared invisible light and photographing an image of the infrared invisible light, and transmitting the image and position signal to upper computer software; and S3: an OpenCV computer vision library in the upper computer software receiving the image and identifying the tracked target from the image, calculating a deviated position of the target relative to an illumination direction of a stage light source, and sending the deviated position to the stage light source element by means of the DMX512 console, and the stage light source element controlling the illumination direction to go toward the target, such that the stage lighting automatically tracks the movement of the target.

The implementation method for step S2 is: firstly, presetting the illumination direction of the stage lighting to point to the target, adjusting the lighting effect of the stage lighting, and then the photographing element photographing the image of the target and monitoring the position of the target in real time, and transmitting the image and position information to the OpenCV computer vision library in the upper computer software.

The implementation method for step S3 is: the OpenCV computer vision library receiving the image and position signal transmitted from the photographing element, firstly extracting and identifying the target from the image, determining the coordinates of the target in the image according to the position information of the target, then tracking the movement of the target in real time, calculating, according to a movement position of the target, information of position of the target deviated from the original coordinates in the image in real time, and transmitting the information of deviated position to the stage light source element by means of the DMX512 console; and finally, the stage light source element controlling the illumination direction of the stage lighting, such that the stage lighting automatically tracks the movement of the target.

The invention claimed is:

1. An automatic stage lighting tracking system, comprising:

an emitting element which is detachably mounted on a target to be tracked;

a stage light source element which is used for illuminating the target to be tracked;

an upper computer software having an OpenCV computer vision library and a DMX512 console; and a photographing element which is used for detecting a position of the emitting element and photographing an image of the target, and transmitting the image and position signal to the upper computer software, wherein the OpenCV computer vision library is configured to process the image transmitted by the photographing element, extract, identify and track the target according to a color in the image, then calculate a deviated position of the target relative to an illumination direction of a stage light source, and send the deviated position to the stage light source element by the DMX512 console; the stage light source element is configured to control the illumination direction to go toward the target, so that the stage lighting achieves automatic tracking movement of the target, and wherein the OpenCV computer vision library is provided with a camshift tracking algorithm, the OpenCV computer vision library sends an identified color of the target to the camshift tracking algorithm, the camshift tracking algorithm is configured to track a movement of the target, obtain coordinate information of the target, calculate the deviated position of the target relative to the illumination direction of a stage light source, and send the deviated position to the upper machine software, and the upper machine software controls to change values of scanning channels of the stage light in horizontal and vertical directions, so that lighting of the stage light source moves toward direction of the target.

2. The automatic stage lighting tracking system according to claim 1, wherein the emitting element is an infrared emitting element for emitting infrared invisible light.

3. The automatic stage lighting tracking system according to claim 1, wherein the photographing element is configured to mount on the stage light source element in parallel to a light-emitting optical axis of the stage light source element, and wherein the photographing element is configured to rotate together with the stage light source element, and change a tracked photographing angle with the illumination direction of the stage light source element changing.

4. The automatic stage lighting tracking system according to claim 1, wherein signal between the stage light source element and the DMX512 console is transmitted by a DMX512 converter, so that the upper computer software transmits a control signal to the DMX512 console, and then the DMX512 console executes a control command to control the illumination direction of a stage light to go toward the target by the DMX512 converter, the stage lighting thus achieve automatically tracking movement of the target.

5. The automatic stage lighting tracking system according to claim 1, wherein the photographing element comprises a camera and a filter mounted in the camera for cutting off the transmission of visible light.

6. The automatic stage lighting tracking system according to claim 2, wherein the infrared emitting element comprises a light-emitting driving circuit and several infrared LEDs with a wavelength of 940 nm, and the infrared LEDs are respectively in communication with the light-emitting driving circuit.

7. A control method using the automatic stage lighting tracking system according to claim 1, wherein the control steps thereof comprise:

S1: an emitting element being detachably mounted on a target to be tracked;

S2: a photographing element detecting the position of the emitting element and photographing an image of the target, and transmitting the image and position signal to upper computer software; and S3: an OpenCV computer vision library in the upper computer software receiving the image and identifying the target to be tracked from the image, calculating a deviated position of the target relative to an illumination direction of a stage light source, and sending the deviated position to the stage light source element by the DMX512 console, and the stage light source element controlling the illumination direction to go toward the target, such that the stage lighting automatically tracks the movement of the target.

8. The control method for the automatic stage lighting tracking system according to claim 7, wherein S2 comprises: presetting the illumination direction of the stage lighting to point to the target, adjusting the lighting effect of the stage lighting, and then the photographing element photographing the image of the target and monitoring the position of the target in real time, and transmitting the image and position information to the OpenCV computer vision library in the upper computer software.

9. The control method for the automatic stage lighting tracking system according to claim 7, wherein S3 comprises: the OpenCV computer vision library receiving the image and position signal transmitted from the photographing element, firstly extracting and identifying the target from the image, determining a coordinate of the target in the image according to the position information of the target, then tracking the movement of the target in real time, calculating, according to a movement position of the target, information of position of the target deviated from the original coordinates in the image in real time, and transmitting the information of deviated position to the stage light source element by the DMX512 console; and finally, the stage light source element controlling the illumination direction of the stage lighting to go toward the target, such that the stage lighting automatically tracks the movement of the target.

* * * * *